L. A. SPENGLER.
CAMPING BED.
APPLICATION FILED FEB. 14, 1921.
1,409,421. Patented Mar. 14, 1922.
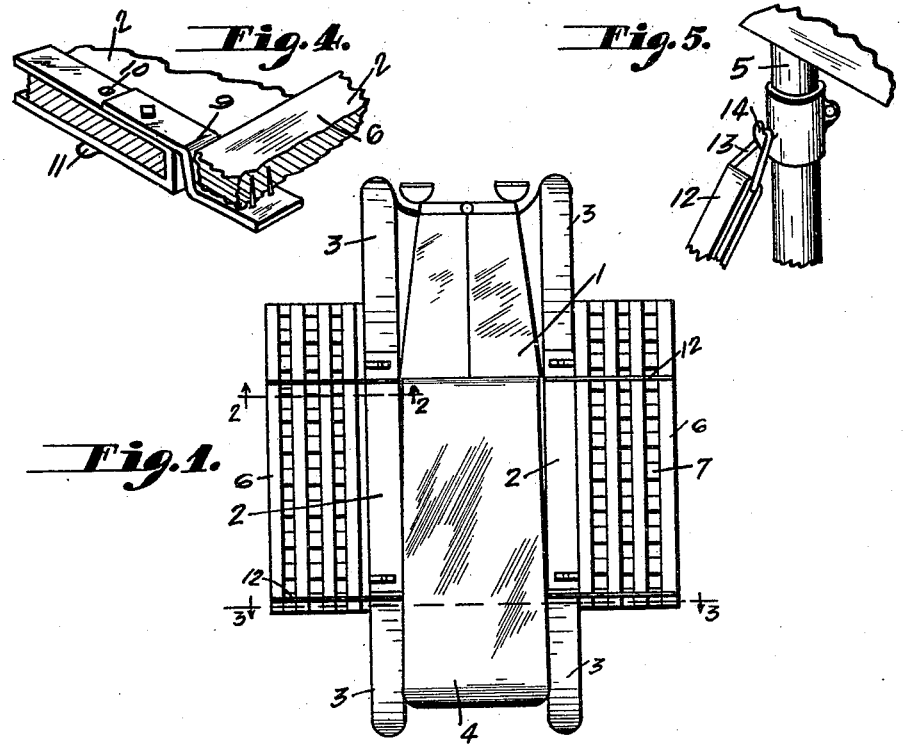
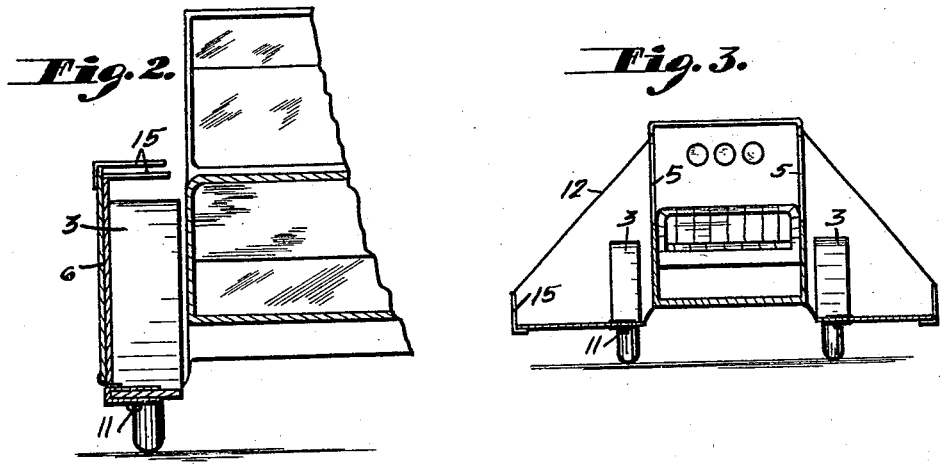
Lewis A. Spengler
INVENTOR.
BY
Hazard & Miller
ATTORNEY.

UNITED STATES PATENT OFFICE.

LEWIS A. SPENGLER, OF LOS ANGELES, CALIFORNIA.

CAMPING BED.

1,409,421. Specification of Letters Patent. Patented Mar. 14, 1922.

Application filed February 14, 1921. Serial No. 444,646.

*To all whom it may concern:*

Be it known that I, LEWIS A. SPENGLER, a citizen of the United States, residing at Los Angeles, in the county of Los Angeles and State of California, have invented new and useful Improvements in Camping Beds, of which the following is a specification.

It is the object of this invention to provide a camping bed particularly adapted to be mounted upon the side of a motor vehicle and so arranged as to be swung either into inoperative position against the side of the vehicle for transportation or swing outwardly for use. The bed when in this latter position having a suspension support instead of usual legs resting upon the ground and by the use of which ants and the like may crawl into the bed.

The invention will be readily understood from the following description of the accompanying drawings, in which Figure 1 is a plan view of a motor vehicle equipped with the improved camping beds and showing the same in position for use.

Fig. 2 is a transverse section on the line 2—2 of Fig. 1, partly broken away, and showing the beds folded into inoperative position for transportation.

Fig. 3 is a transverse section on the line 3—3 of Fig. 2 showing the beds in position for use.

Fig. 4 is a detail perspective view showing the detachable pivotal connection for one of the camping beds.

Fig. 5 is a detail perspective showing the connection between the suspension support for a bed and the frame of the vehicle top.

The improved camping beds are shown mounted upon opposite sides of a usual motor vehicle, and when in use are adapted to be swung outwardly from the running boards of the vehicle and supported by flexible suspensions from the top frame of the vehicle. When the beds are in inoperative position ready for transportation, one of the same is folded upwardly and the other is detached from the running board and placed inside of the first bed frame so as to leave one of the running boards clear and form a luggage carrier within the folded bed frames upon the opposite running board.

In the drawings a usual motor vehicle is shown at 1 provided with usual running boards 2 terminating in mud guards 3 and having a usual top 4 carried by a suitable frame which may include uprights 5.

The bed frames are hinged to the respective running boards and comprise a suitable frame structure 6 preferably consisting of crossed slats 7. The hinge connections provided between a running board and one edge of a bed frame, preferably consist of flexible hinges shown as leather straps 9 connected at one end to the top of the running board and then bent downwardly between the running board and the edge of the bed frame and finally connected at their opposite ends to the under side of the bed frame. The hinge connections for one of the bed frames, preferably the one upon the left-hand running board, are permanently secured to the running board and to the bed frame, while the hinge connections for the bed frame upon the other running board are preferably detachably connected to the running board in order that the bed frame may be readily removed. As an instance of this arrangement bolts 10 extend through the running board so as to hold the ends of the strap hinges against the running board, and these bolts are provided with wing nuts 11 so that they may be readily removed in order to detach the hinges from the running board.

When the beds are swung outwardly for use, they are supported by flexible suspending means connected to the frame of the top of the motor vehicle and to the swinging edges of the bed frames. The flexible suspending means are shown as suitable straps 12 having loops 13 at their upper ends for detachably engaging suitable hooks 14 preferably carried by uprights 5. The other ends of the straps are connected to uprights 15 projecting from the swinging edges of the bed frames. By this arrangement it will be seen that the suspension means are spaced above the bed frames when the latter are in use so that there is no liability of the suspension straps interfering with the occupants of the beds.

When the bed frames are folded for transportation, the frame having the detachable hinge connection with a running board is preferably removed and placed inside of the opposite bed frame which is swung upwardly against the side of the motor vehicle, it being understood that the hinge connection for the second bed frame is so arranged as to provide sufficient space to support the detachable bed frame inside of the same.

When the bed frames are thus folded they will form a luggage receptacle upon the running board which is closed at its respective ends by mud guards 3, at its outer side by the bed frames, and at its top by the uprights 15. The bed frames may be held in folded position by any suitable fastening means.

The construction, as thus described, provides an extremely simple folding bed construction to be employed in connection with motor vehicles and the like, and one in which there is no contact with the ground by the beds when in use due to the improved suspension supports for the swinging edges of the hinged beds.

Various changes may be made without departing from the spirit of the invention as claimed.

What is claimed is:

A camping bed construction comprising a suitable bed frame, leather straps connected to the under side of the bed frame and adapted to be connected to a running board and form hinges, the central portions of which are long enough to allow the upper face of the bed frame to come flush with the upper face of the running board, uprights projecting from the opposite side of the bed frame from the hinge straps, straps connected to the upper ends of the uprights and adapted to be connected to the top frame of an automobile so as to pass high over the bed, the bed frame being longer than the running board so that when the bed frame is mounted upon the running board and folded upwardly the ends of the bed frame will strike the front and rear mud guards and form a receptacle or inclosed space above the running board.

In testimony whereof I have signed my name to this specification.

LEWIS A. SPENGLER.